(12) United States Patent
Bignell et al.

(10) Patent No.: US 8,093,481 B2
(45) Date of Patent: Jan. 10, 2012

(54) SYSTEMS AND METHODS FOR AUTOMATIC COLLISION AVOIDANCE, GROUPING AND ALIGNMENT OF MUSICAL SYMBOLS

(75) Inventors: David Bignell, London (GB); Daniel Spreadbury, Middlesex (GB)

(73) Assignee: Avid Technology, Inc., Burlington, MA (US)

( * ) Notice: Subject to any disclaimer, the term of this patent is extended or adjusted under 35 U.S.C. 154(b) by 238 days.

(21) Appl. No.: 12/623,480

(22) Filed: Nov. 23, 2009

(65) Prior Publication Data

US 2011/0120288 A1   May 26, 2011

(51) Int. Cl.
*G09B 15/00* (2006.01)
*G09B 15/02* (2006.01)
*G10H 1/00* (2006.01)

(52) U.S. Cl. .................. 84/477 R; 84/470 R; 84/471 R; 84/483.2; 84/600

(58) Field of Classification Search ......................... None
See application file for complete search history.

(56) References Cited

U.S. PATENT DOCUMENTS

| | | | |
|---|---|---|---|
| 6,281,420 B1 * | 8/2001 | Suzuki et al. | 84/477 R |
| 7,462,772 B2 * | 12/2008 | Salter | 84/477 R |
| 7,495,165 B2 * | 2/2009 | Suzuki et al. | 84/622 |
| 7,539,941 B2 * | 5/2009 | Suzuki et al. | 715/716 |
| 7,640,501 B2 * | 12/2009 | Suzuki et al. | 715/723 |
| 2004/0094017 A1 * | 5/2004 | Suzuki et al. | 84/609 |
| 2007/0175317 A1 * | 8/2007 | Salter | 84/609 |
| 2008/0289477 A1 * | 11/2008 | Salter | 84/477 R |
| 2011/0120288 A1 * | 5/2011 | Bignell et al. | 84/483.1 |
| 2011/0167988 A1 * | 7/2011 | Berkovitz | 84/483.2 |

OTHER PUBLICATIONS

Finale 2002 documentation, "Engraver Slurs", released Jul. 23, 2002, 1 page.
Finale 2002 documentation, "Expression Designer-Positioning", released Jul. 23, 2002, 2 pages.

* cited by examiner

*Primary Examiner* — Marlo Fletcher
(74) *Attorney, Agent, or Firm* — Oliver Strimpel

(57) ABSTRACT

Systems and methods for editing a computer-base musical score include detecting a collision between objects placed in the score and automatically moving one of the colliding objects out of the way to eliminate the collision. Selection of the object to be moved is based on a comparison of the priority levels of the colliding objects. To enhance clarity and legibility of the score, objects are organized into groups of similar type objects. Groups are treated as a single object for the purposes of avoiding collisions. Certain object types are transformed, including scaled, rotated, or sheared, to avoid collisions.

28 Claims, 12 Drawing Sheets

FIG. 4

SYSTEMS AND METHODS FOR AUTOMATIC COLLISION AVOIDANCE, GROUPING AND ALIGNMENT OF MUSICAL SYMBOLS

BACKGROUND

There are centuries-old conventions for placement of musical symbols in printed sheet music, all of which are designed to ensure that the music is presented as clearly and unambiguously as possible to performers. The general principle is that no two symbols should be allowed to collide with each other, though there are important exceptions, such as musical notes, and symbols such as clefs and key signatures that collide with the stave on which they are positioned.

This general principle gives rise to hundreds of specific conventions concerning the placement of particular kinds of symbols. For example, lyric text should be positioned below the staff in a row across the width of system, as close as possible vertically to the notes to which they belong; text dynamics and hairpin lines should be aligned at the same vertical position relative to the stave above, below any low notes, and grouped such that if they are within a certain horizontal distance, they should be aligned together, so that the musician's eye can take them in at a single glance.

Other objects should be aligned down the score across multiple staves. For example, if several instruments all have a change of dynamic at the same rhythmic position, those dynamics should ideally be positioned at the same horizontal position on all staves, so that the conductor can take them all in at a single glance.

Creating scores that adhere to these conventions is a laborious and time-consuming process. It involves painstaking adjustment of individual objects in order to make the score as clear, pleasing to the eye, and unambiguous as possible. Music notation software in general is able to provide default positions for different types of objects. However, more than half the time creating a score is still consumed by manual adjustments of the musical objects.

SUMMARY

In general, the invention features systems and methods for laying out objects in a musical score to render the score as legible and pleasing to the eye, as well as to make efficient use of the available space. The methods are based on codifications of score-writing practice built up over centuries and spanning different musical genres and styles. The described systems and methods enable scores to be generated with a much higher degree of automation than has been possible hitherto, radically reducing or even completely eliminating the need for manual adjustment of musical objects in a machine-generated score.

In general, in one aspect, a computer-implemented method of editing a musical score includes inserting an object of a first type into the musical score at an inserted location, the first type having a predetermined first priority level; detecting whether the inserted object overlaps with a pre-existing object of a second type, the second type having a predetermined second priority level; if an overlap is detected with the pre-existing object, selecting one of the inserted object and the pre-existing object, wherein the selection is based on a comparison of the first priority level with the second priority level, and displacing the selected one of the inserted object and the pre-existing object by a displacement sufficient to eliminate the detected overlap.

Some embodiments include one or more of the following features. The first priority level is equal to the second priority level, the first type having a first predetermined handicap, the second type having a second predetermined handicap, and basing the selection on a comparison of the first predetermined handicap and the second predetermined handicap. The predetermined first and second priority levels are determined in part on an analysis of observed proximities of objects of the first type and second type respectively to a stave to which the objects refer in a corpus of musical scores. A boundary of the inserted object includes a first set of one or more polygons that enclose the inserted object and a boundary of the pre-existing object comprises a second set of one or more polygons that enclose the pre-existing object, and detecting an overlap between objects involves detecting an overlap between the first set of one or more polygons and the second set of one or more polygons when the inserted object is at the inserted location. The pre-existing object is a member of a group of objects, the group of objects including one or more members of the second type in addition to the first-mentioned pre-existing object, and displacing all of the members of the group by the displacement sufficient to eliminate the detected overlap. The pre-existing object is a member of a horizontal group including a horizontal set of members, the set of members of the horizontal group being substantially horizontally aligned in the score, and wherein the pre-existing object is a member of a vertical group comprising a vertical set of members, the vertical members being substantially vertically aligned in the score, and displacing a selected one of the horizontal set of members and the vertical set of members by the displacement sufficient to eliminate the detected overlap. Detecting whether one or more objects of the first type other than the inserted object are present in the score within a region of the musical score defined by the inserted location, and, if one or more objects of the first type are detected in the score within the region, grouping the inserted object with the detected one or more objects. The region of the score includes a rectangular region having a width and a length and an axis parallel to the length, the axis bisecting the rectangular region, wherein the axis intersects the inserted location. Detecting whether an object of the first type other than the inserted object is present within the score within a predetermined distance, and, if an object of the first type is detected within the predetermined distance, grouping the inserted object with the detected object. The predetermined distance is specific to the objects of the first type, i.e., it the distance may vary depending on the value of the first type. Constraining the displacement sufficient to eliminate the overlap to be less than a predetermined maximum allowable range of motion; the maximum allowable range of motion is specific to the type of the selected one of the inserted object and the pre-existing object. The selected object has a musical meaning within the score, and constraining the displacement to be less than a predetermined maximum allowable range of motion preserves the musical meaning of the selected object.

In another aspect, a computer-implemented method of editing a musical score includes inserting an object of a first type into the musical score at an inserted location, the first type having a predetermined first priority level; detecting whether the inserted object overlaps with a pre-existing object of a second type, the second type having a predetermined second priority level; if an overlap is detected with the pre-existing object, selecting one of the inserted object and the pre-existing object, wherein the selection is based on a comparison of the first priority level with the second priority level, and transforming the selected one of the inserted object and the pre-existing object by an amount sufficient to eliminate the detected overlap.

Some embodiments include one or more of the following features. The selected one of the inserted object and the pre-existing object includes a hairpin dynamic object, and the transforming step includes scaling the hairpin dynamic object in a horizontal direction. The selected one of the inserted object and the pre-existing object is a slur object, and the transforming step includes transforming the slur object from a first Bezier curve having a first set of parameters to a second Bezier curve having a second set of parameters, the second set of parameters being different from the first set of parameters. The selected one of the inserted object and the pre-existing object is a slur object, and wherein the transforming step includes a combination of a. transforming the slur object from a first Bezier curve to a second Bezier curve, b. translating the slur object, and c. increasing a distance between a slur endpoint and a note corresponding to the slur endpoint.

Under another aspect, a computer program product includes a computer-readable medium with computer program instructions encoded thereon, wherein the computer program instructions, when processed by a computer, instruct the computer to perform a method for editing a musical score, the method including: inserting an object of a first type into the musical score at an inserted location, the first type having a predetermined first priority level; detecting whether the inserted object overlaps with a pre-existing object of a second type, the second type having a predetermined second priority level; if an overlap is detected with the pre-existing object, selecting one of the inserted object and the pre-existing object, wherein the selection is based on a comparison of the first priority level with the second priority level, and displacing the selected one of the inserted object and the pre-existing object by a displacement sufficient to eliminate the detected overlap.

BRIEF DESCRIPTION OF THE DRAWINGS

FIG. 4 is a screenshot of an interface for user adjustment of musical object layout parameters.

DETAILED DESCRIPTION

In general, the described embodiment of a musical notation system allows composers to create a musical score that adheres to score-writing conventions without the need for manual intervention. The system includes a codification of the natural order of precedence for the placement of musical symbols relative to the staff into a rules-based system that defines an overall order of priority, such that higher priority objects force lower-priority objects to move out of their way. The rules also define allowable planes of movement (e.g., up/down, left/right, or both), ranges of movement (i.e., how far in the allowed planes of movement the object is allowed to move), and whether objects should be grouped together with other identical or similar objects, horizontally or vertically, or, in some cases, both. Collision avoidance based on the priority system comes into play to govern the layout of symbols in the white space between the staves, as well as, to a lesser extent, to govern the placement of symbols on the staves.

When a user of the system inserts a new object into a score, or adjusts the position of an object within the score, the system dynamically determines whether any collisions have been generated. The system operates on an entire stave by examining all the objects attached to the stave, as well as any objects that may be connected to that stave via an association with multi-stave groupings of objects. Smaller as well as larger portions of the score can also be considered for collisions, depending on the circumstances and the nature of the score. The system then resolves collisions by dynamically redrawing the objects at new positions, such that their actual positions are not saved as coordinate data, but are instead derived based on the outcome of an algorithm that analyses the position of every object in real time. However, if a particular symbol insertion or adjustment does not implicate a certain portion of the score, the system may use previously calculated positions of the unaffected symbols without re-examining the unaffected portions for collisions. Although most collisions are resolved by a single horizontal or vertical movement, some objects may undergo diagonal movement. In some situations, an object may have to be moved twice or more in order to resolve a collision, such as, for example, if both horizontal and vertical movement is required.

Figure 1:
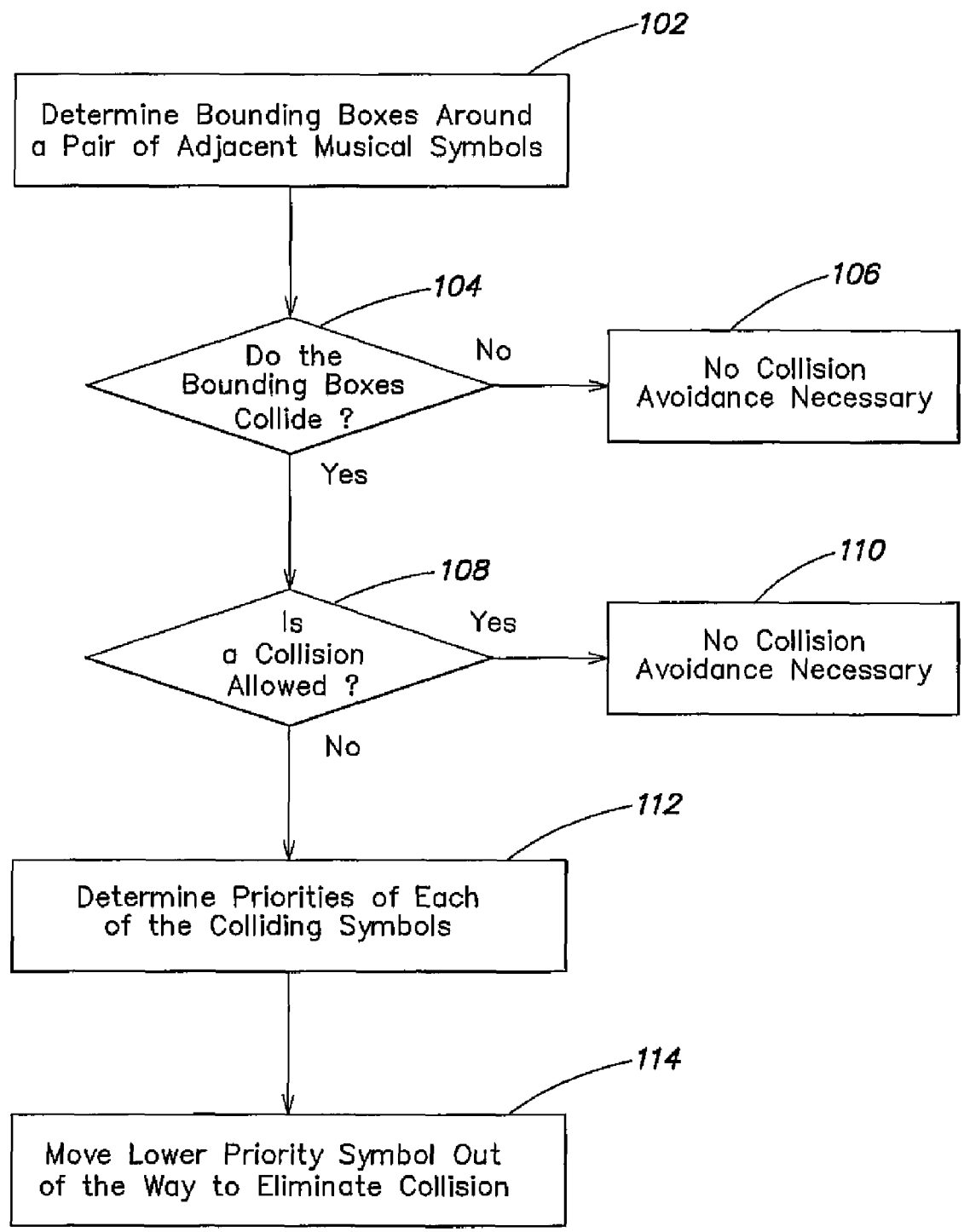
FIG. 1 is a high level flow diagram of the described process for avoiding collisions between objects on a musical score.
Figure 2:
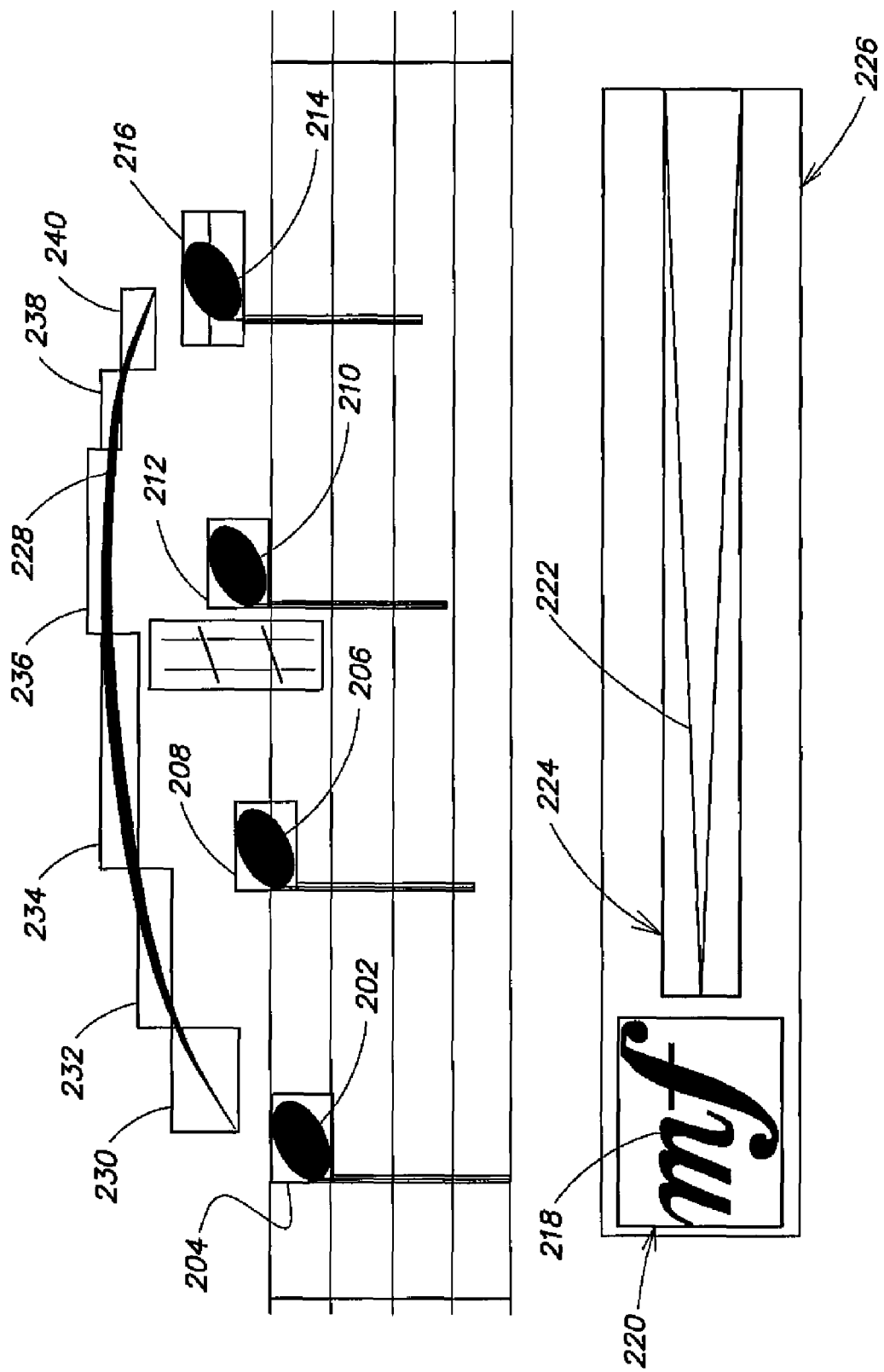
FIG. 2 illustrates musical object bounding boxes.

Referring to FIG. 1, for any given pair of musical symbols, the system determines boundary boxes around each member of the pair (102). For most objects, the bounding box is a rectangle, with the edges of the rectangle being parallel to the edges of the page. Referring to FIG. 2, which shows some examples of bounding boxes, individual notes 202, 206, 210, and 214 are bounded by rectangular boxes 204, 208, 212, and 216, text dynamic 218 is bounded by box 220, and hairpin dynamic 222 is bounded by box 224. The group consisting of text dynamics 218 and hairpin 222 is bounded by box 226. For some objects, such as slurs, the bounding box is made up of multiple smaller rectangles, as shown for slur 228, which is bounded by a set of smaller boxes 230, 232, 234, 236, 238, and 240, each of which bound a segment of slur 228. Bounding boxes may be aligned with the page, or be oriented diagonally on the page.

After generating the bounding boxes, the system examines the boxes to see if they abut or overlap (FIG. 1, 104). If the boxes do not overlap or abut, no collision has been created, and no avoidance action is required (106). On the other hand, if the boxes do abut or overlap, the pair are deemed to collide.

Figure 3:
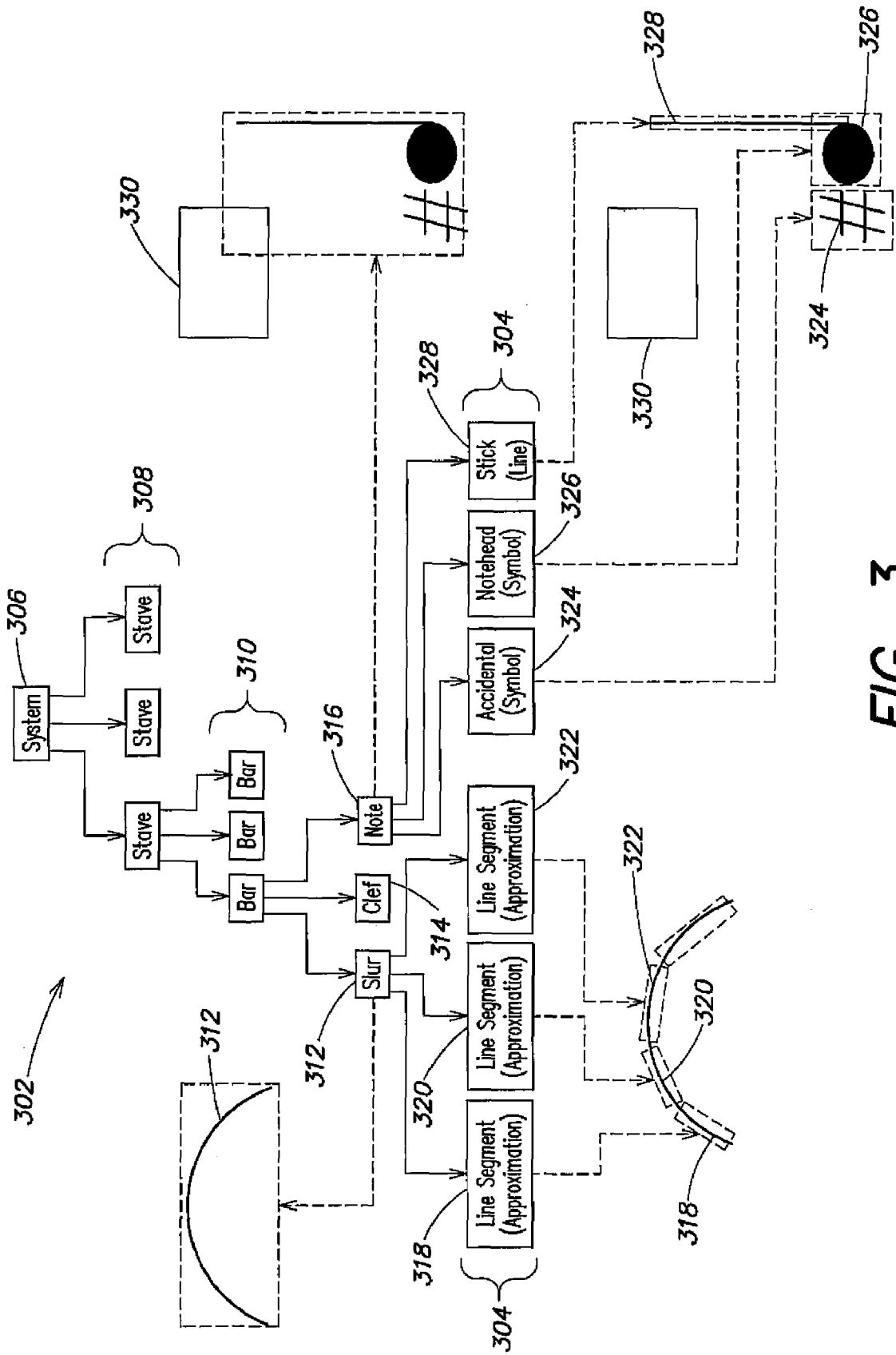
FIG. 3 illustrates a musical object tree used for collision detection.

We now describe a method of performing the collision search, with reference to FIG. 3. Objects are stored in tree data structure 302 for quick searching. Leaves 304 on the tree are the basic primitive objects that are used to build up the displayed score objects. Examples of primitives are lines, symbols, circles, pieces of text, etc. For example, note 202 (FIG. 2) constitutes a line for the stick, and a symbol for the notehead.

At the root of the tree is system object 306. The system contains, for example, several stave objects 308, each of which contains several bar objects 310, each of which may contain objects such as slur 312, clef 314, and note 316. Each of these objects in turn contain primitives 304. Thus, referring still to FIG. 3, slur 312 contains line segment approximations 318, 320, 322, and note 316 contains accidental symbol 324, notehead symbol 326, and stick line 328.

The bounding box of each object is calculated as being the union of the child bounding boxes. Thus the bounding box of system 306 is the smallest rectangle that contains the bounding boxes of staves 308, the stave bounding box is the rectangle that contains the bounding box of that stave's bars 310, and so on, traversing the tree down to primitives 304.

Collision testing is performed by traversing this tree if an object's bounding box overlaps the system's bounding box, then it is tested against the bounding boxes of the staves. If it overlaps a stave bounding box, it is tested against the bars, and so on, until the colliding primitives are found. In the example illustrated in FIG. 3, an object bounded by rectangle 330 collides with note object 316, but testing against the bounding boxes of that note's primitives (accidental 324, notehead 326, and stick 328), reveals that there is no collision.

Bounding boxes for many of the primitives are axis-aligned rectangles, as mentioned above, but in some cases a primitive has an alternate bounding box that includes convex bounding polygons, or other arbitrary shapes. The system tests such bounding boxes last, so that if an object collides with a rectangular bounding box of a primitive, it can then be tested against the primitive's bounding polygon for a more accurate collision determination. Objects that have polygon bounding boxes include beam lines, such as in a group of sixteenth notes, diagonal lines, such as in hairpins, rotated text, such as in tuplets, and line segments which are used to approximate slurs.

If the system detects a collision, it refers to a cohabitation map, which specifies which types of objects are allowed to collide in order to determine whether the detected collision is allowed (108). Most examples of allowed collisions involve the stave. For example, the stave is allowed to collide with a note, a clef, a key signature, a time signature, a rest, and a measure line. If a collision is allowed, no collision avoidance action is required (110). On the other hand, if the collision is not allowed, the system determines the respective priorities of each of the colliding symbols (112). The priority system is discussed in more detail below. The symbol having the lower priority is then moved so as to eliminate the detected abutment or overlap, and remove the collision (114). The direction and range of movement of the displaced symbol is constrained in order to preserve the symbol's meaning, as discussed below.

The order of priority is based on the principle that types of objects that should naturally lie closest to the stave are given the highest priorities, and those types of objects that can lie further away from the stave are given progressively lower priorities. A priority level is assigned to a particular type of object. In the described embodiment, over 50 types of object are defined, including but not limited to the following: bar rest, beam, clef, key signature, bar line (measure line), time signature, tie, bar number, bend, tuplet, grouped bar numbers, box line, gliss line, lyrics, grouped lyrics, slur, line, miscellaneous line, trill line, expression text, hairpin, grouped dynamics (horizontal), grouped dynamics (vertical), technique text, miscellaneous text, chord symbol, legacy chord symbol, grouped chord symbols, grouped legacy chord symbols, repeat ending line, grouped repeat ending lines, rehearsal mark, grouped rehearsal marks (horizontal), grouped rehearsal marks (vertical), system text, grouped system text (vertical), figured bass text, function symbol text, roman numeral text, grouped figured bass text, grouped Roman numerals text, grouped function symbols text, pedal line, grouped pedal lines, graphic, and symbol. The default priority order that is assigned to each type of object is determined by prior examination and analysis of a large corpus of printed music drawn from a range of different styles and genres. This yields a set of priorities that control the ordering of objects on a score that is broadly applicable to a wide range of printed music. In the described embodiment, the approximately 50 different types of score objects are assigned to one of 20 different priority levels, which are arbitrarily assigned values ranging from 0 (highest priority level, normally closest to the stave) to 19 (lowest priority level, allowed to be furthest from the staff). Thus in this scheme, lower numbered priority level values have higher priority than higher numbered priority level values. In most cases, different types of objects that are assigned the same priority level rarely conflict because they typically occur on opposite sides of the staff.

Figure 4:
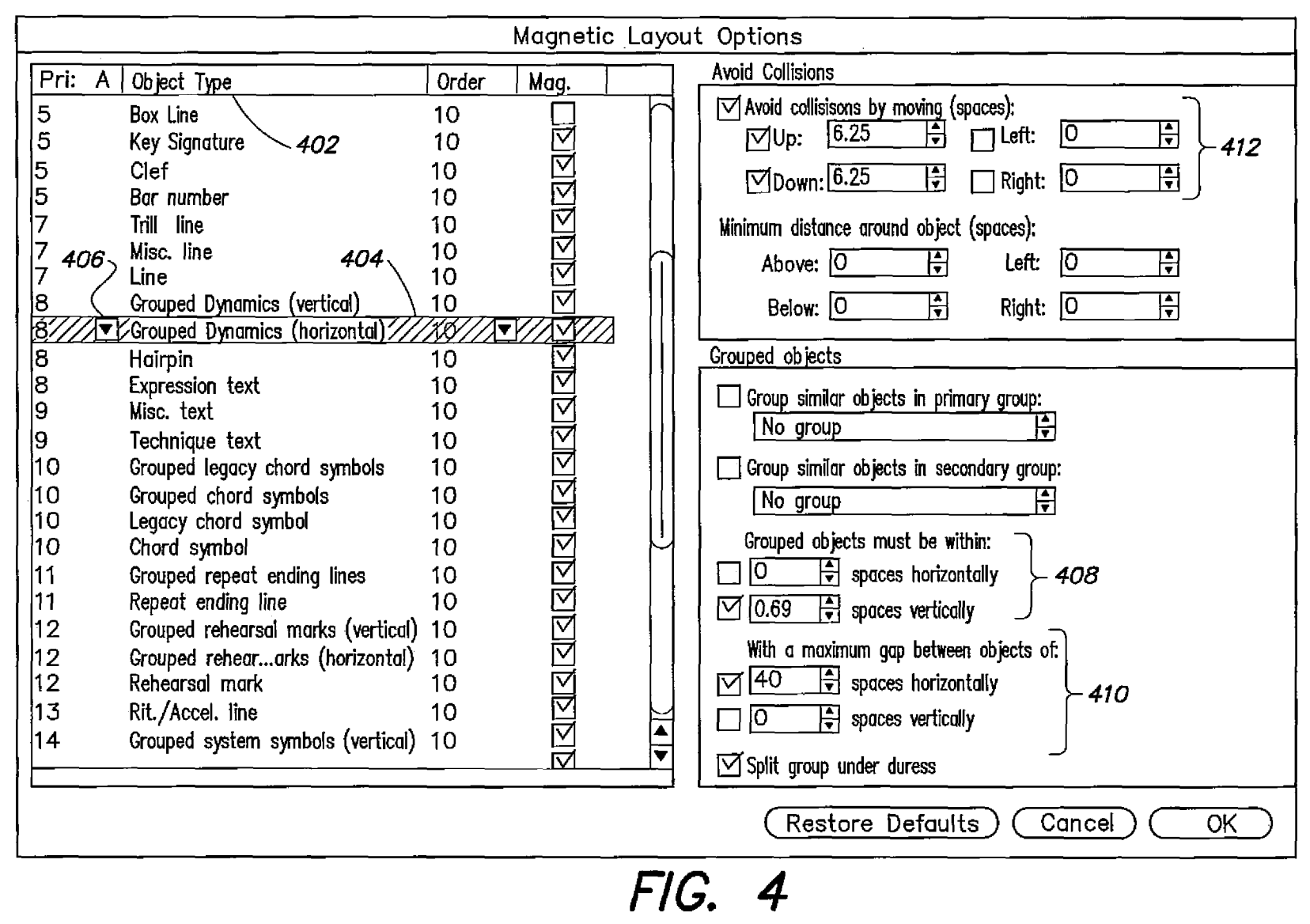

The system permits users to override the default priority for each type of object by entering a different priority. A graphical user interface for enabling a user to set their own priority levels is illustrated in FIG. 4, which is a screen shot of the layout options window in the described embodiment. The system displays list 402 of the various object types, and the user selects the object type 404 for which the default priority level is to be overridden. By clicking in pull-down menu 406, the user can select a new priority level to assign to objects of the selected type. Currently assigned priority levels appear in the column displayed along the left side of layout options window.

In the situation when two objects having the same priority level collide, a handicapping system, which is a refinement of the priority system, is used to resolve the conflict and to determine which object is moved to avoid the collision. The handicap system uses rules that depend on the specific objects involved, and apply only to a subset of score objects. Examples of handicapping rules include, but are not limited to the following. Slurs and tuplets are handicapped according to a set of rules that attempts to place smaller slurs closer to the stave. Some objects are handicapped according to their default positions relative to the stave, with the system preferentially displacing objects that have default positions further from the staff. Examples include trill lines, octave lines, and articulations. Handicaps may be based on the size of an object, with larger items being given preference. For example, if an octave line conflicts with a trill, generally the trill will be moved since it is smaller than the octave line. When an object is part of a group (discussed in detail below), vertical groups are handicapped with respect to horizontal groups of objects of the same type, such that horizontal groups are preferentially displaced. If handicaps are equal, the number of children belonging to an object comes into play to determine the outcome of the collision. Referring again to the example illustrated in FIG. 3, note 316 has three children—the accidental, the notehead, and the stick. If it were to collide with another object having equal priority but only two children, the object with two children would move. Another example involves a collision with a horizontal or a vertical group. A horizontal group of six hairpins is considered to be one object (the group) with six children (the hairpins). A colliding object with the same priority would have to have at least seven children to win the fight. This helps to ensure the fewest objects get disrupted.

Once the system has determined which object should move to resolve a collision, a set of rules of motion are applied to determine the direction and magnitude of the collision-avoiding movement. When moving an object to resolve a collision, the system follows constraints that apply both to the direction of movement and the range of movement allowed. The constraints depend on the type of object that is to be moved, and serve to prevent changing the meaning of an object, and, to the extent possible, to avoid reducing the clarity of the score. These constraints are represented by a set of maximum ranges of allowable movement for each type of object, as shown in Table 1. The values are given in "space" units, with one space corresponding to the distance between adjacent staves. Very few objects are permitted to move to the left, because this would often mean that the object would appear to be associated with a note prior to the one with which it is actually associated. Vertical movement, both up and down, is more frequently permitted. The ranges of movement are limited to prevent an object from being moved far enough that it appears to be associated with another note, or possibly even with a different stave. For many objects the system evaluates both horizontal and vertical movement, selecting the direction of movement that resolves the collision using the smallest displacement of the moving object in any direction, including diagonally. Objects in this category include, but are not limited to, technique text, miscellaneous text, gliss lines, and symbols. Other objects are permitted to move only in one plane. Examples include, but are not limited to, tuplets and articulations, which are limited to vertical movement. Some objects, such as notes, are not allowed to move at all since moving a note up or down changes its meaning. In addition, certain objects, such as bar numbers, may be restricted to move in only one plane when they occur by themselves, but they can also belong to a group that can be moved in the other plane. Furthermore, some objects may not be allowed to move at all by themselves, but can belong to one or more groups which can move them. Expression text belongs in this category; it can be moved left and right by its vertical group, and up and down by its horizontal group.

Although the system is provided with a set of predetermined allowable ranges of motion for each type of object, the system permits the user to override the ranges of allowable motion in each of the four directions (up, down, left, and right), for each type of object using a layout settings dialog (FIG. 4, 412). In the example shown in FIG. 4, the user selected grouped dynamic (horizontal), and the currently set values of the range of allowable movement for this type of group object appears in settings dialog 412.

Score objects can be organized into groups. Groups serve to structure the score, enabling the score editor to maintain object alignment while the system automatically avoids collisions. A group consists of objects of the same or similar type that the eye needs to see in one glance as a connected set. Horizontal groups, distributed horizontally across the score, help the eye to discern the temporal connection between objects of the same type, so that, for example, bar numbers can be distinguished from rehearsal marks, or dynamics can be distinguished from tempo markings. Vertical groupings align objects in time, and arise when symbols are repeated down the page. Examples include tempo marks, dynamics, and rehearsal marks. Vertical groups between staves can help a conductor determine at a glance that a group of instruments share a common musical element, for example entering at the same time with the same dynamic. Most symbols that are members of a vertical group are also members of a horizontal group. The horizontal group is usually given a higher priority (called the "primary" group) than the vertical (called the "secondary" group) group. In other words, if an object that is a member of both a horizontal group and a vertical group needs to move in order to avoid a collision, the vertical group of which it is a member gives way, and is moved (to the left or right). The clarity of a score depends crucially on good alignment and layout, especially within the limited white space that is available between staves, since many different kinds of symbols compete for the reader's attention.

A key property of a group is that, for the purposes of collision avoidance, a group is treated as a single object. Thus, when an object is considered part of a group, if it moves, all other objects in the group move together with it.

Members of a group are all of the same type, but sometimes a given type can have multiple forms. For example, dynamics can take the form of text (e.g., p, m, f, etc.) or hairpins. As another example, pedal lines can take the form of pedal up lines, pedal down lines, and pedal end lines.

Figure 5A:
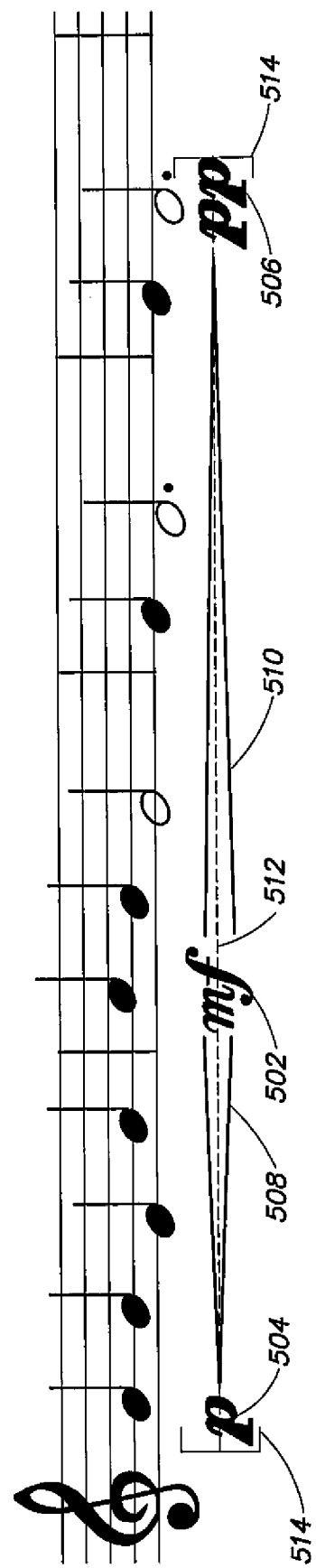
FIGS. 5A, 5B, and 5C illustrate the display of musical object group membership.
Figure 5B:
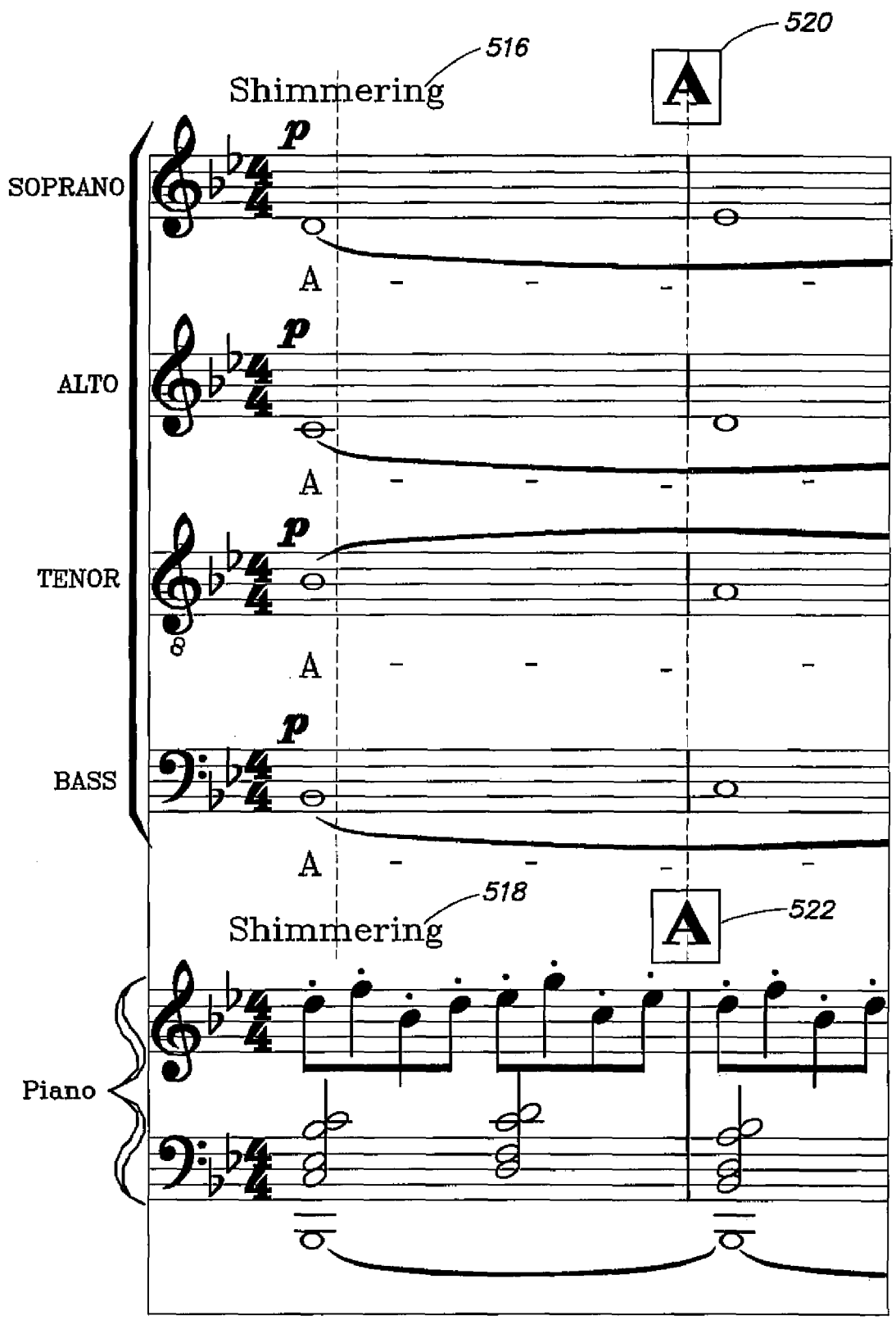
Figure 5C:
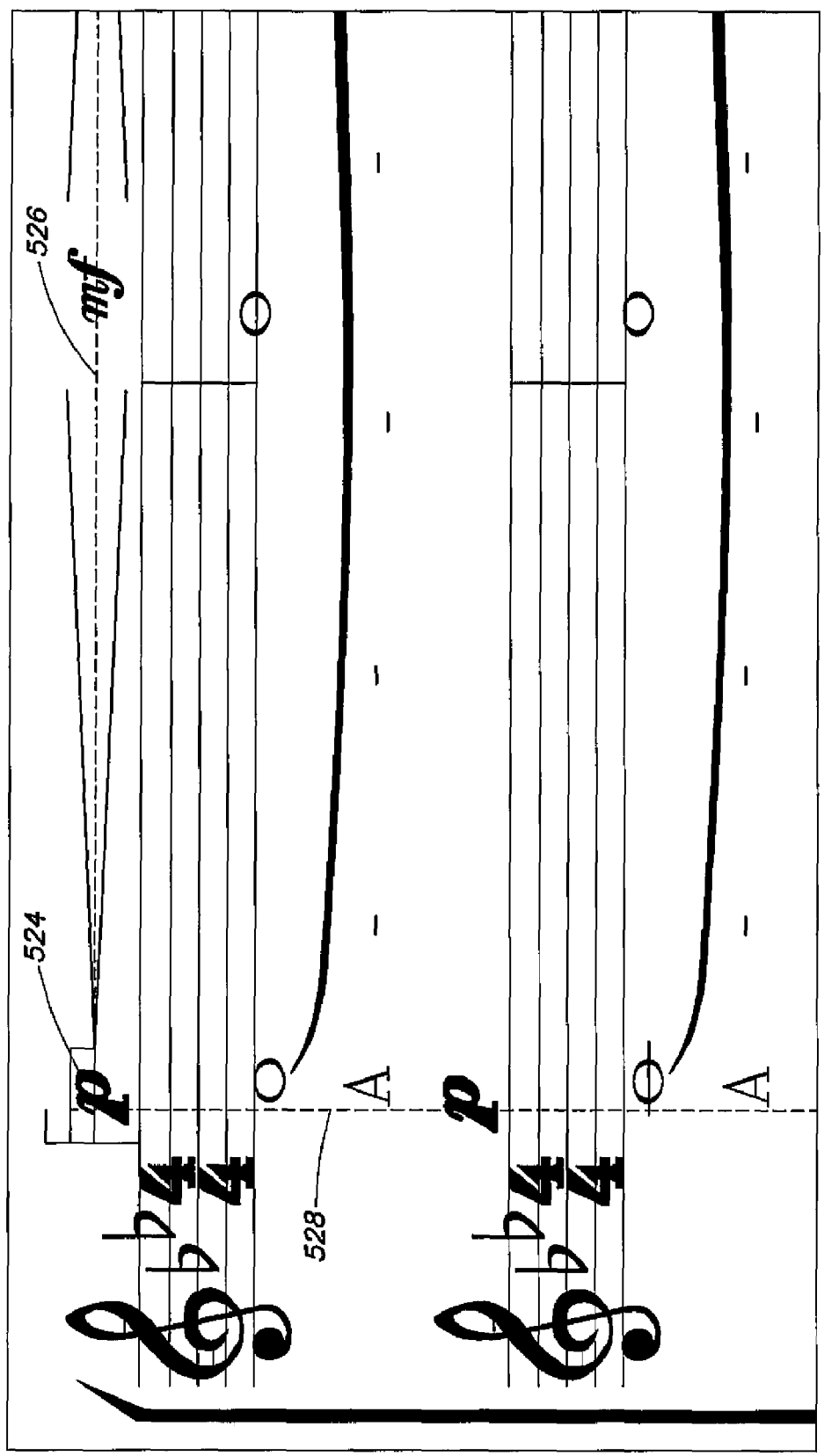

When a user selects an object, such as by pointing to it with a pointing device such as a mouse and clicking on it, or inserts a new object, the system highlights the object and gives the user an indication of the one or more groups of which it forms a part (if any) by displaying a line extending horizontally or vertically from that item through other group members, delimited by a square bracket, as illustrated in FIGS. 5A-5C. An example of a horizontal group appears in FIG. 5A, illustrating that text dynamic mf (502) is a member of a group including other text dynamics p (504) and pp (506), as well as two hairpins (508, 510). Dashed straight line 512 indicates the axis of alignment of the group, and square brackets 514 indicate the extent of the group. Two examples of vertical groups are illustrated in FIG. 5B: expression text "Shimmering" (516, 518) appears above the choir stave and also above the piano stave, and form part a vertical group; and rehearsal marks "A" (520 and 522) also form a vertical group. In FIG. 5C, text dynamic p (524) is a member of both horizontal group 526 and vertical group 528.

When a user inserts an object into the score, the system places the object in a default position corresponding to the object's type. The system then determines whether to place the object into a group, based on the current settings of group parameters, such as the maximum gap, which is described below.

Figure 6:
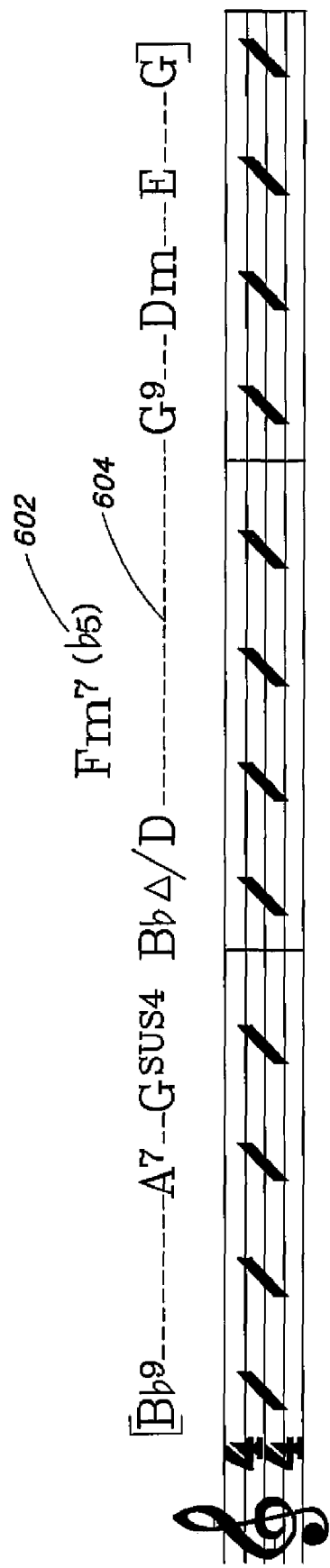
FIG. 6 illustrates musical objects within a group and outside a group.

Although the system automatically places a newly inserted object in alignment with the other objects of the same type, and objects with which it may be grouped, the user may manually adjust the placement of individual items within a group. For example, the user may wish to fine-tune the alignment of symbols to enhance their relationship, without wishing to remove any of the symbols from a group they belong to. In the described embodiment, the user simply drags the object to a new position within the group, creating an offset. The system stores the user's horizontal and vertical displacement of the object as an offset from the object's natural, aligned position within the group. Whenever the group is moved to avoid a collision, the displaced object is redrawn within the group with its relative offset preserved. If the user displaces a selected group member beyond the currently set horizontal or vertical thresholds for the group the selected object is removed from the group. Referring to FIG. 6, an example of an object that has been removed from its group is chord symbol 602, which has been vertically displaced beyond the vertical threshold for the chord symbol group 604 that lies below it. During score editing, as the user moves a selected object around in the score, group indicator markings may appear and disappear as the object moves in and out of the confines of a group as determined by the current settings of the group threshold values.

The group threshold specifies, for a given type of group, how close a member object of the group needs to be to the axis of alignment of the other objects in the group in order to remain part of the group. Objects that are moved outside the specified threshold lose their membership in the group. Horizontally aligned groups (i.e., groups that are aligned in rows having a horizontal axis of alignment) are specified by a vertical threshold; vertically aligned groups (i.e., groups that are aligned in columns having a vertical axis of alignment) are specified by a horizontal threshold.

Unless overridden by the user, the system uses default values of the thresholds for groups formed from each type of member object. These default values are based on a codification of a large corpus of published sheet music comprising many thousands of pages that span a variety of historical periods and musical styles. The preset values correspond to the values derived from analysis of the corpus.

Table 2 is a listing of empirically determined default horizontal and vertical threshold values for group membership for each type of object. The values are given in "space" units, with one space corresponding to the distance between adjacent staves. The system enables a user to override the default threshold values for group membership. As illustrated in FIG. 4, a user interface for this purpose enables a user to select a type of object (404) from a list of objects (402) and then, if the object is of a type that can be grouped, insert new horizontal and vertical threshold values (408).

The system also considers whether a maximum horizontal or vertical gap between an object and other like objects (either individual objects or a group of objects) is exceeded before adding an object to a group. For example, a dynamic object positioned near the left side of the page might not be musically related to a group of dynamics clustered near the right side of the page on the same stave, and it may therefore be inappropriate to add it to the group. For vertical groups of dynamics, a default maximum gap is just under one stave spacing. Thus, by default, a vertical group needs to have a member on each successive stave. For example, if a vertical group consists of text dynamics on staves 1, 2, 3, and 4, and the dynamic on stave 2 is deleted, then the gap between the dynamic on stave 1 and the rest of the group exceeds the allowed maximum, and the dynamic on stave 1 is removed from the group, leaving only the dynamics on staves 3 and 4 remaining in the group. On the other hand, no upper limit to the allowable gap is appropriate for certain types of object such as, for example, lyrics, pedal lines, and bar numbers in the case of horizontal groups, and tempo marks and rehearsal marks for vertical groups. Even though such types of object are often separated by large gaps, a person reading the score generally prefers to see all such object types aligned, no matter how far apart they lie. Table 3 lists default maximum gaps in the described embodiment derived from analysis of a large corpus of printed music spanning a period of centuries and different musical styles. The user may override the default maximum gap settings using, for example, the layout options interface illustrated in FIG. 4 (410).

Figure 7A:
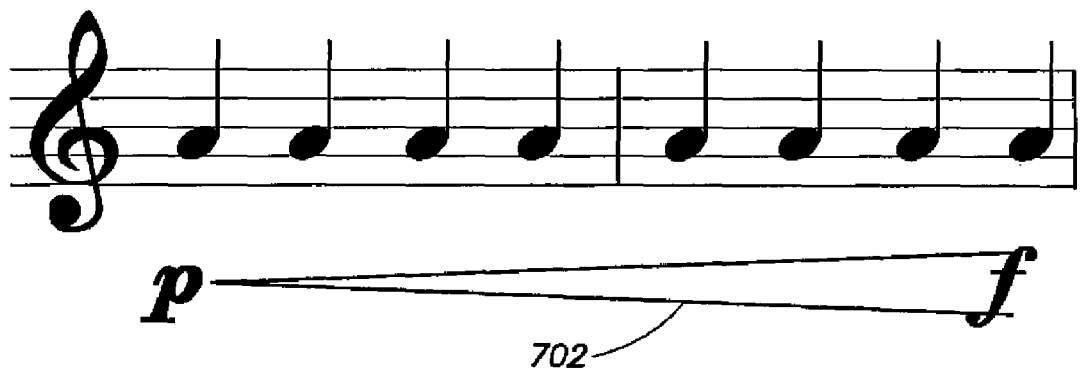
FIGS. 7A, 7B, and 7C illustrate the scaling of hairpins.
Figure 7B:
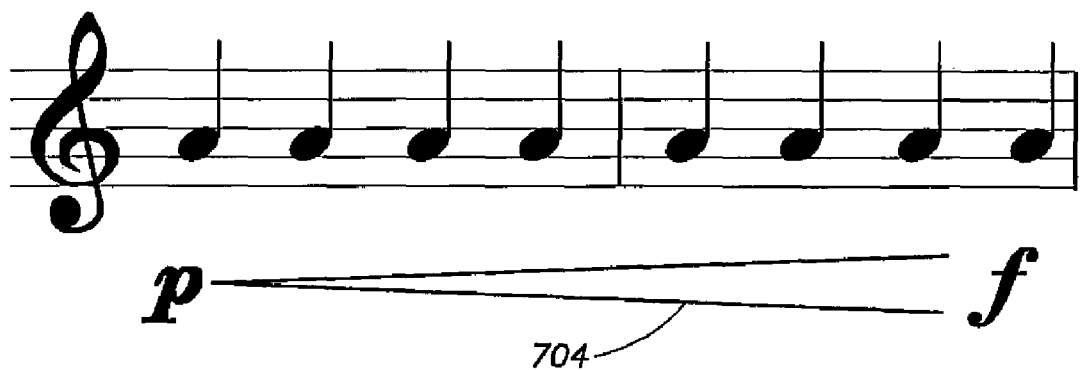
Figure 7C:
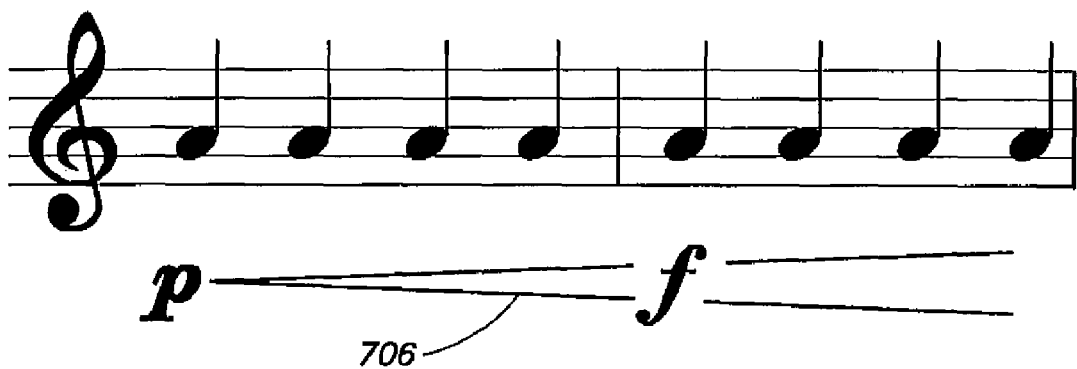

For certain types of object, in addition to moving the object, the system can resolve collisions by changing the object's size and/or shape, the two main examples being hairpins and slurs. One type of scalable object is the hairpin dynamic, which is scalable to fit between text dynamics at one or both ends of the hairpin. Since the position of a text dynamic is tied to a specific note, it cannot be moved much without losing its correct meaning. As shown in FIGS. 7A-7C, rather than move the colliding hairpin (FIG. 7A, 702) out of the way of a text dynamic, the system shrinks the hairpin in length (FIG. 7B, 704). In order to retain the conventional appearance of the hairpin, the system maintains a constant aperture at the open end of the hairpin while changing the hairpin length. In other situations, the user may want the dynamic instruction represented by a hairpin to extend beyond a text dynamic that is tied to a particular note. In order to achieve this, the system enables the user to extend hairpin 706 beyond the text dynamic, which then becomes embedded within the body of the hairpin, as shown in FIG. 7C.

Slurs are a second type of object for which the system can resolve collisions by changing the object's shape. Since slurs are curved, the use of a single rectangular bounding box is not very effective when determining collisions since it could result in leaving considerable empty space around the slur. Therefore the system determines slur boundaries by breaking the slur up into several sections and generating a rectangular bounding box around each section, as described above and illustrated in FIG. 2 for slur 228 and bounding boxes 230, 232, 234, 236, 238, 240. When a slur collision is detected, the system attempts to avoid the collision while retaining a pleasing shape for the slur. Traditionally slurs were drawn using French curves. The system models these using a subset of cubic Bezier curves. In order to retain a slur's pleasing shape, the system only permits the curve's control points to be moved vertically, and according to four types of transformation. These are vertical translation, which corresponds to moving the four control points of a curve by the same amount, shearing around the left endpoint, shearing around the right endpoint, and scaling the slur by fixing the endpoints and moving the midpoints. The system evaluates the non-colliding slur created by each of these four transformations, and scores it based on a number of factors, including proximity of the endpoints to their ideal positions, and overall slur symmetry. It then combines these transformations according to their scores, to produce a hybrid transformation that resolves the slur's collision while attempting to maintain legibility and symmetry.

Figure 8A:
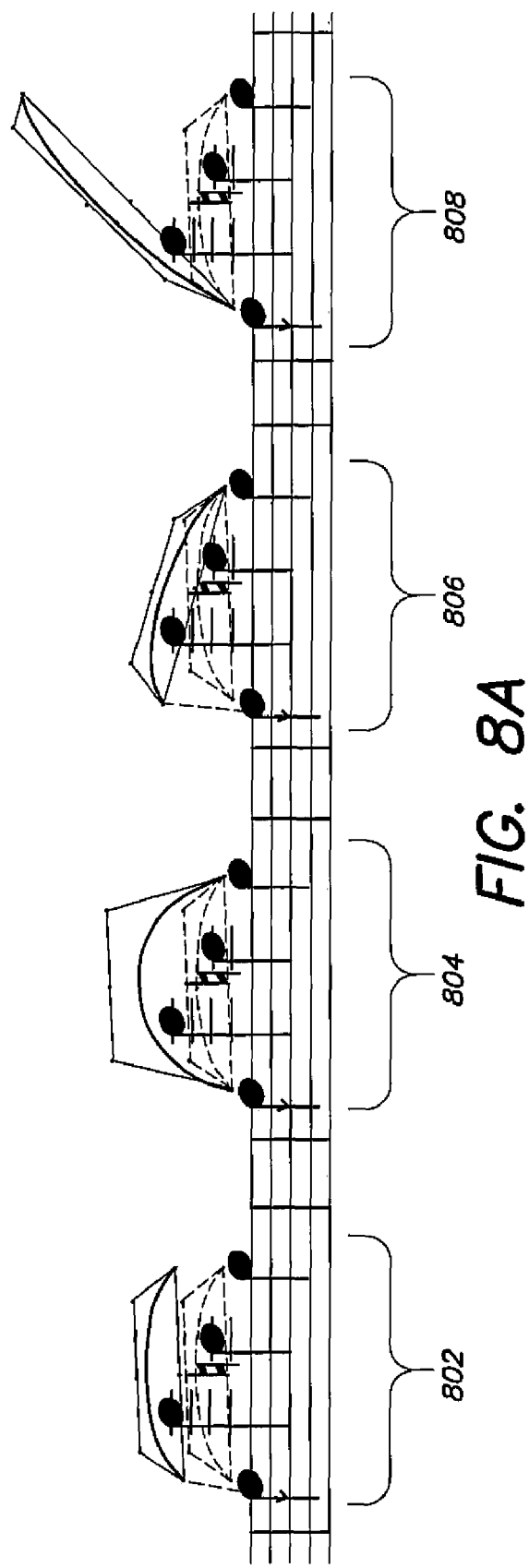
FIG. 8 illustrates slur transformations.
Figure 8B:
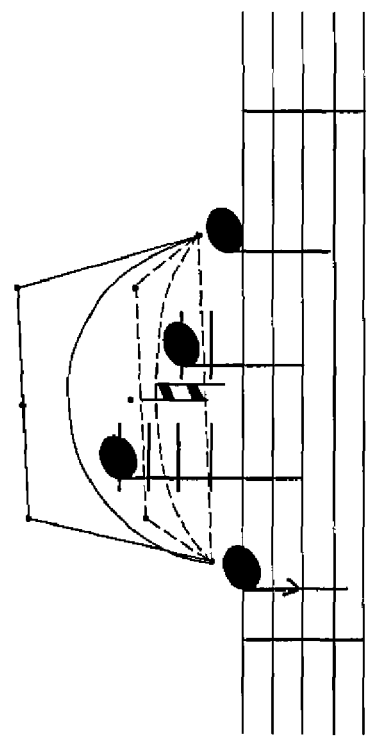

FIG. 8A illustrates the four slur transformations available to the system. Other transformations may be used in addition to these four, or as alternatives to them. In the Figure, the dotted slur in each case shows the slur's original position, and the solid slur shows the transformed slur. Applying translation (802) simply moves the slur vertically without changing its shape, but results in endpoints that are distant from their corresponding notes. Application of the scaling transform (804) changes the shape of the slur, making it more curved, or "loopy," without moving the endpoints. Shear about the right endpoint (806) and shear about the left endpoint (808) involve moving one endpoint as well as a change in slur shape. FIG. 8B illustrates the final slur chosen by the system to avoid the collision. It uses a combination of transformations, in this example including shear about the right endpoint (involving a slight clockwise rotation about the right endpoint), scaling (the slur is taller), and translation (both endpoints have been moved further from the notes).

In relatively rare situations, the system is unable to avoid a collision. This can happen, for example, when a very high note or very low note is placed on the stave. The system identifies these collisions, and invites the user to resolve them manually. If the user permits, the system can resolve a collision by moving a single member of the group only when it is unable to do so by moving the whole group.

Figure 9A:
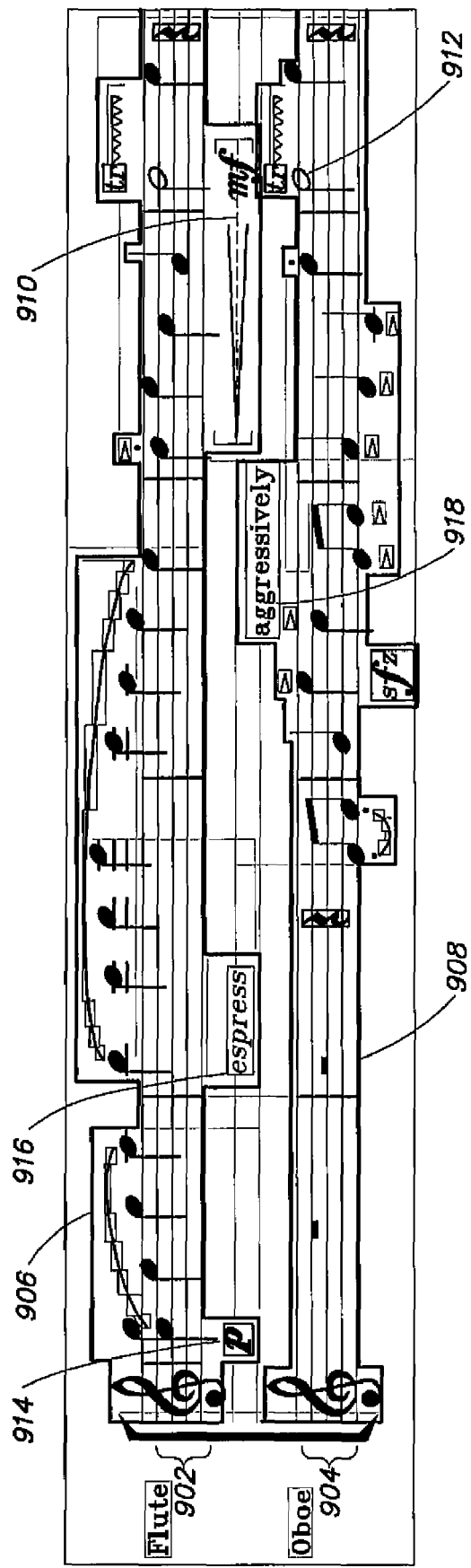
FIGS. 9A and 9B illustrate the use of irregular bounding boxes around staves.
Figure 9B:
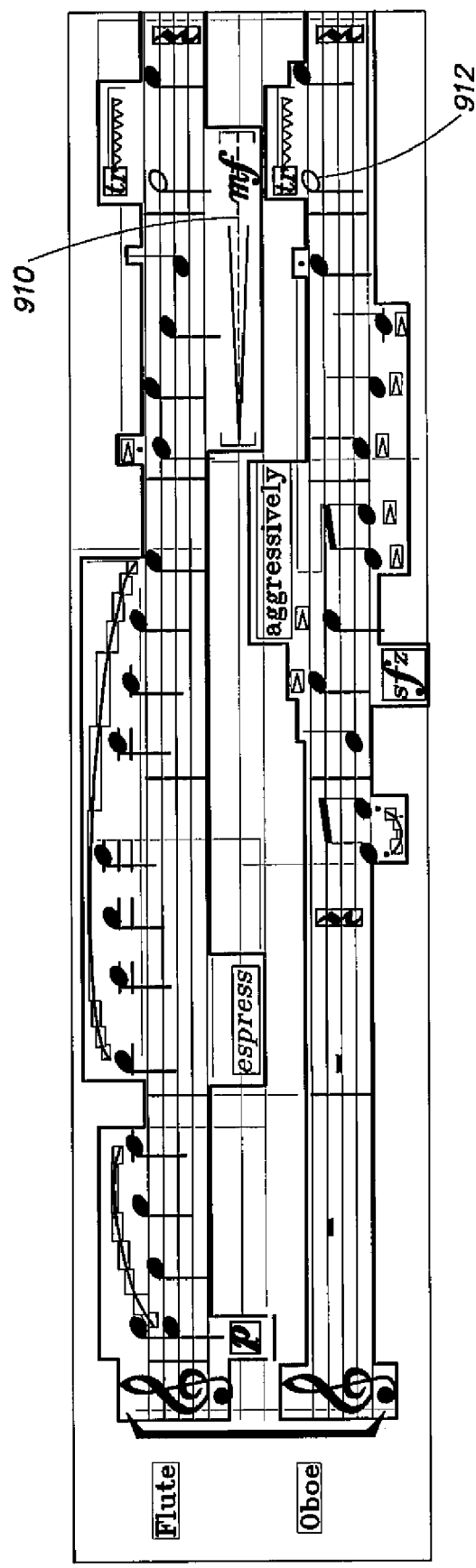

By default, the system is not able to adjust the spacing between staves. However, when no optimization of layout is able to resolve the collision, the user can explicitly permit the system to adjust the spacing between staves. In these situations, the system determines the smallest possible bounding box around all the objects associated with the stave. The bounding box may have an irregular shape. For example, if a very high note appears on the left side of the stave but not on the right side, an irregular bounding box that is wider on the left is generated. FIGS. 9A and 9B illustrate how the system resolves a collision between staves using irregular bounding boxes. Referring to FIG. 9A, flute stave 902 and oboe stave 904 are respectively bounded by irregular boxes 906 and 908. The boxes collide where flute text dynamic group 910 overlaps with trilled oboe note 912. Since the system determines collisions between staves by looking for overlap between irregular bounding boxes, it appropriately detects no collision between vertically overlapping flute dynamics 910, 914 and expression text 916 with oboe expression text 918 because there is no horizontal overlap. If the system was limited to rectangular bounding boxes it would not be able to distinguish permissible vertical (but not horizontal) overlap from a collision. The system therefore increases the spacing between the staves, as shown in FIG. 9B, by an amount sufficient to eliminate only the overlap at flute text dynamic group 910 and oboe trilled note 912. This technique permits close-packing of the staves, thereby making efficient use of vertical space.

The various components of the system described herein may be implemented as a computer program using a general-purpose computer system. The computer system may be a standalone system, either fixed or portable, or may be incorporated into a multimedia recording device, a mobile communication device, or on a server connected to a local area or wide area network. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, loudspeakers and other audio output devices, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

TABLE 1

Default values for the ranges of allowable movement.

| Object type | Maximum range of movement (spaces) | | | |
|---|---|---|---|---|
| | Up | Down | Left | Right |
| Bar number | 0 | 0 | 6.25 | 6.25 |
| Bar rest | N/A | N/A | N/A | N/A |
| Barline | N/A | N/A | N/A | N/A |
| Beam | N/A | N/A | N/A | N/A |
| Bend | N/A | N/A | N/A | N/A |
| Box line | N/A | N/A | N/A | N/A |
| Chord symbol | 0 | 0 | 0.63 | 0.63 |
| Clef | N/A | N/A | N/A | N/A |
| Expression text | N/A | N/A | N/A | N/A |
| Figured bass text | N/A | N/A | N/A | N/A |
| Function symbol text | N/A | N/A | N/A | N/A |
| Gliss. Line | 6.25 | 6.25 | 6.25 | 6.25 |
| Graphic | N/A | N/A | N/A | N/A |
| Grouped Roman numerals text | 6.25 | 6.25 | 0 | 0 |
| Grouped bar numbers | 6.25 | 6.25 | 0 | 0 |
| Grouped chord symbols | 6.25 | 6.25 | 0 | 0 |
| Grouped dynamics (horizontal) | 6.25 | 6.25 | 0 | 0 |
| Grouped dynamics (vertical) | 0 | 0 | 3 | 0.31 |
| Grouped figured bass text | 6.25 | 6.25 | 0 | 0 |
| Grouped function symbols text | 6.25 | 6.25 | 0 | 0 |
| Grouped legacy chord symbols | 6.25 | 6.25 | 0 | 0 |
| Grouped lyrics | 3 | 8 | 0 | 0 |
| Grouped pedal lines | 6.25 | 6.25 | 0 | 0 |
| Grouped percussion stickings text | 6.25 | 6.25 | 0 | 0 |
| Grouped rehearsal marks (horizontal) | 6.25 | 6.25 | 0 | 0 |
| Grouped rehearsal marks (vertical) | 0 | 0 | 1 | 8 |
| Grouped repeat ending lines | 6.25 | 6.25 | 0 | 0 |
| Grouped system symbols (vertical) | 0 | 0 | 6.25 | 6.25 |
| Grouped system text (vertical) | 0 | 0 | 6.25 | 6.25 |
| Grouped tempo marks (horizontal) | 6.25 | 6.25 | 0 | 0 |
| Grouped tempo marks (vertical) | 0 | 0 | 0 | 6.25 |
| Hairpin | N/A | N/A | N/A | N/A |
| Key signature | N/A | N/A | N/A | N/A |
| Legacy chord symbol | 0 | 0 | 0.63 | 0.63 |
| Line | 6.25 | 6.25 | 0 | 0 |
| Lyrics | N/A | N/A | N/A | N/A |
| Misc. text | 10 | 10 | 0 | 0 |
| Pedal line | N/A | N/A | N/A | N/A |
| Percussion sticking text | N/A | N/A | N/A | N/A |
| Rehearsal mark | N/A | N/A | N/A | N/A |
| Repeat ending line | N/A | N/A | N/A | N/A |
| Rit./Accel. line | 6.25 | 6.25 | 0 | 0 |
| Roman numeral text | N/A | N/A | N/A | N/A |
| Symbol | 6.25 | 6.25 | 6.25 | 6.25 |

TABLE 1-continued

Default values for the ranges of allowable movement.

|  | Maximum range of movement (spaces) | | | |
|---|---|---|---|---|
| Object type | Up | Down | Left | Right |
| System symbol | 6.25 | 6.25 | 0 | 0 |
| System text | 6.25 | 6.25 | 6.25 | 6.25 |
| Technique text | 6.25 | 6.25 | 6.25 | 6.25 |
| Tempo text | N/A | N/A | N/A | N/A |
| Tie | N/A | N/A | N/A | N/A |
| Time signature | N/A | N/A | N/A | N/A |
| Trill line | 6.25 | 6.25 | 0 | 0 |
| Tuplet | 6.25 | 6.25 | 0 | 0 |

TABLE 2

Default values for the threshold values for group membership for each type of object.

|  |  | Maximum threshold (spaces) | |
|---|---|---|---|
| Grouped objects | Group direction | Horiz. | Vert. |
| Roman numerals text | Horizontal | 0 | 0.5 |
| Bar numbers | Horizontal | 0 | 0.5 |
| Chord symbols | Horizontal | 0 | 2 |
| Dynamics | Horizontal | 0 | 0.69 |
| Dynamics | Vertical | 0.5 | 0 |
| Figured bass text | Horizontal | 0 | 0.5 |
| Function symbols text | Horizontal | 0 | 0.5 |
| Legacy chord symbols | Horizontal | 0 | 2 |
| Lyrics | Horizontal | 0 | 4 |
| Pedal lines | Horizontal | 0 | 0 |
| Percussion sticking text | Horizontal | 0 | 2 |
| Rehearsal marks | Horizontal | 0 | 0.5 |
| Rehearsal marks | Vertical | 0.5 | 0 |
| Repeat ending lines | Horizontal | 0 | 0.5 |
| System symbols | Vertical | 0.5 | 0 |
| System text | Vertical | 0.5 | 0 |
| Tempo marks | Horizontal | 0 | 1 |
| Tempo marks | Vertical | 0.5 | 0 |

TABLE 3

Default values for maximum gaps.

|  |  | Maximum gap (spaces) | |
|---|---|---|---|
| Grouped objects | Group direction | Horiz. | Vert. |
| Dynamics | Horizontal | 40 | 0 |
| Dynamics | Vertical | 0 | 16 |
| Lyrics | Horizontal | 0 | 4 |
| System text | Vertical | 0 | 6.25 |

What is claimed is:

1. A computer-implemented method of editing a musical score, the method comprising:
   inserting an object of a first type into the musical score at an inserted location, the first type having a predetermined first priority level;
   detecting whether the inserted object overlaps with a pre-existing object of a second type, the second type having a predetermined second priority level;
   if an overlap is detected with the pre-existing object, selecting one of the inserted object and the pre-existing object, wherein the selection is based on a comparison of the first priority level with the second priority level, and displacing the selected one of the inserted object and the pre-existing object by a displacement sufficient to eliminate the detected overlap.

2. The method of claim 1 wherein the first priority level is equal to the second priority level, the first type having a first predetermined handicap, the second type having a second predetermined handicap; the method further comprising basing the selection on a comparison of the first predetermined handicap and the second predetermined handicap.

3. The method of claim 1, wherein the predetermined first and second priority levels are determined in part on an analysis of observed proximities of objects of the first type and second type respectively to a stave to which the objects refer in a corpus of musical scores.

4. The method of claim 1, wherein a boundary of the inserted object comprises a first set of one or more polygons that enclose the inserted object and a boundary of the pre-existing object comprises a second set of one or more polygons that enclose the pre-existing object, and wherein the detecting step comprises detecting an overlap between the first set of one or more polygons and the second set of one or more polygons when the inserted object is at the inserted location.

5. The method of claim 1, wherein the pre-existing object is a member of a group of objects, the group of objects comprising one or more members of the second type in addition to the first-mentioned pre-existing object, the method further comprising displacing all of the members of the group by the displacement sufficient to eliminate the detected overlap.

6. The method of claim 1, wherein the pre-existing object is a member of a horizontal group comprising a horizontal set of members, the set of members of the horizontal group being substantially horizontally aligned in the score, and wherein the pre-existing object is a member of a vertical group comprising a vertical set of members, the vertical members being substantially vertically aligned in the score, the method further comprising displacing a selected one of the horizontal set of members and the vertical set of members by the displacement sufficient to eliminate the detected overlap.

7. The method of claim 1 further comprising:
   detecting whether one or more objects of the first type other than the inserted object are present in the score within a region of the musical score defined by the inserted location; and
   if one or more objects of the first type are detected in the score within the region, grouping the inserted object with the detected one or more objects.

8. The method of claim 7, wherein the region of the score comprises a rectangular region having a width and a length and an axis parallel to the length, the axis bisecting the rectangular region, wherein the axis intersects the inserted location.

9. The method of claim 1 further comprising:
   detecting whether an object of the first type other than the inserted object is present within the score within a predetermined distance; and
   if an object of the first type is detected within the predetermined distance, grouping the inserted object with the detected object.

10. The method of claim 9, wherein the predetermined distance is specific to the objects of the first type.

11. The method of claim 1, further comprising constraining the displacement sufficient to eliminate the overlap to be less than a predetermined maximum allowable range of motion.

12. The method of claim 11, wherein the predetermined maximum allowable range of motion is specific to the type of the selected one of the inserted object and the pre-existing object.

13. The method of claim 11, wherein the selected object has a musical meaning within the score, and constraining the displacement to be less than a predetermined maximum allowable range of motion preserves the musical meaning of the selected object.

14. A computer-implemented method of editing a musical score, the method comprising:
inserting an object of a first type into the musical score at an inserted location, the first type having a predetermined first priority level;
detecting whether the inserted object overlaps with a pre-existing object of a second type, the second type having a predetermined second priority level;
if an overlap is detected with the pre-existing object, selecting one of the inserted object and the pre-existing object, wherein the selection is based on a comparison of the first priority level with the second priority level, and transforming the selected one of the inserted object and the pre-existing object by an amount sufficient to eliminate the detected overlap.

15. The method of claim 14, wherein the selected one of the inserted object and the pre-existing object comprises a hairpin dynamic object, and the transforming step includes scaling the hairpin dynamic object in a horizontal direction.

16. The method of claim 14, wherein the selected one of the inserted object and the pre-existing object is a slur object, and the transforming step includes transforming the slur object from a first Bezier curve having a first set of parameters to a second Bezier curve having a second set of parameters, the second set of parameters being different from the first set of parameters.

17. The method of claim 14, wherein the selected one of the inserted object and the pre-existing object is a slur object, and wherein the transforming step includes a combination of a. transforming the slur object from a first Bezier curve to a second Bezier curve, b. translating the slur object, and c. increasing a distance between a slur endpoint and a note corresponding to the slur endpoint.

18. A computer program product, comprising:
a computer-readable medium with computer program instructions encoded thereon, wherein the computer program instructions, when processed by a computer, instruct the computer to perform a method for editing a musical score, the method comprising:
inserting an object of a first type into the musical score at an inserted location, the first type having a predetermined first priority level;
detecting whether the inserted object overlaps with a pre-existing object of a second type, the second type having a predetermined second priority level;
if an overlap is detected with the pre-existing object, selecting one of the inserted object and the pre-existing object, wherein the selection is based on a comparison of the first priority level with the second priority level, and displacing the selected one of the inserted object and the pre-existing object by a displacement sufficient to eliminate the detected overlap.

19. The computer program product of claim 18, wherein the predetermined first and second priority levels are determined in part on an analysis of observed proximities of objects of the first type and second type respectively to a stave to which the objects refer in a corpus of musical scores.

20. The computer program product of claim 18, wherein a boundary of the inserted object comprises a first set of one or more polygons that enclose the inserted object and a boundary of the pre-existing object comprises a second set of one or more polygons that enclose the pre-existing object, and wherein the detecting step comprises detecting an overlap between the first set of one or more polygons and the second set of one or more polygons when the inserted object is at the inserted location.

21. The computer program product of claim 18, wherein the pre-existing object is a member of a group of objects, the group of objects comprising one or more members of the second type in addition to the first-mentioned pre-existing object, the method further comprising displacing all of the members of the group by the displacement sufficient to eliminate the detected overlap.

22. The computer program product of claim 18, wherein the method further comprises:
detecting whether one or more objects of the first type other than the inserted object are present in the score within a region of the musical score defined by the inserted location; and
if one or more objects of the first type are detected in the score within the region, grouping the inserted object with the detected one or more objects.

23. The computer program product of claim 22, wherein the region of the musical score is defined specifically for objects of the first type.

24. The computer program product of claim 18, wherein the displacement is constrained to be less than a predetermined maximum allowable range of motion, the predetermined maximum allowable range of motion that preserves a musical meaning of the selected object.

25. A computer program product, comprising:
a computer-readable medium with computer program instructions encoded thereon, wherein the computer program instructions, when processed by a computer, instruct the computer to perform a method for editing a musical score, the method comprising:
inserting an object of a first type into the musical score at an inserted location, the first type having a predetermined first priority level;
detecting whether the inserted object overlaps with a pre-existing object of a second type, the second type having a predetermined second priority level;
if an overlap is detected with the pre-existing object, selecting one of the inserted object and the pre-existing object, wherein the selection is based on a comparison of the first priority level with the second priority level, and transforming the selected one of the inserted object and the pre-existing object by an amount sufficient to eliminate the detected overlap.

26. The computer program product of claim 25, wherein the selected one of the inserted object and the pre-existing object comprises a hairpin dynamic object, and the transforming step includes scaling the hairpin dynamic object in a horizontal direction.

27. The computer program product of claim 25, wherein the selected one of the inserted object and the pre-existing object is a slur object, and the transforming step includes transforming the slur object from a first Bezier curve having a first set of parameters to a second Bezier curve having a second set of parameters, the second set of parameters being different from the first set of parameters.

28. The computer program product of claim 25, wherein the selected one of the inserted object and the pre-existing object is a slur object, and wherein the transforming step includes a combination of a. transforming the slur object from a first Bezier curve to a second Bezier curve, b. translating the slur object, and c. increasing a distance between a slur endpoint and a note corresponding to the slur endpoint.

* * * * *